June 4, 1963
V. A. CREAMER
3,091,842
METHOD OF ASSEMBLING A THREADED NUT IN NON-ROTATABLE ENGAGEMENT WITH A SUPPORT
Filed June 12, 1959
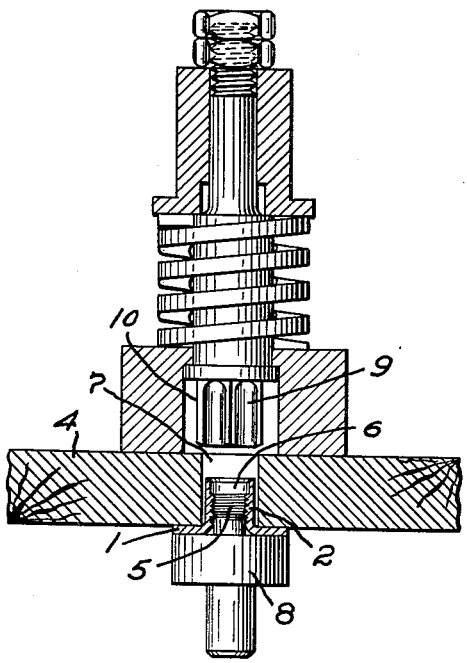
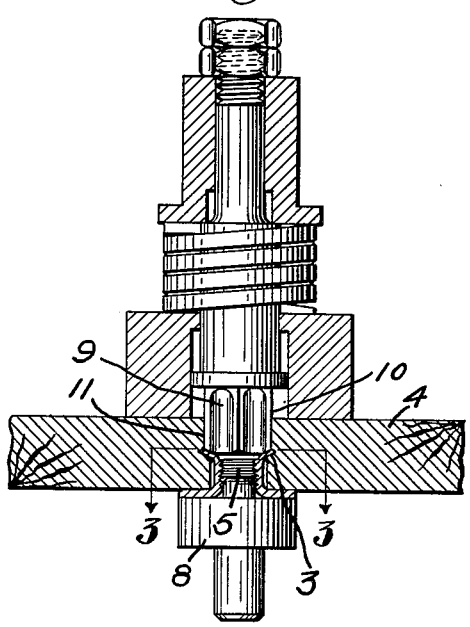
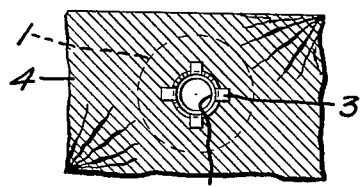
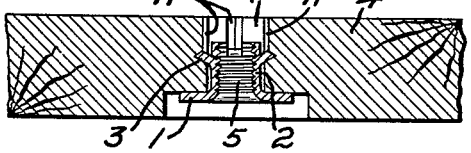
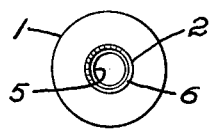
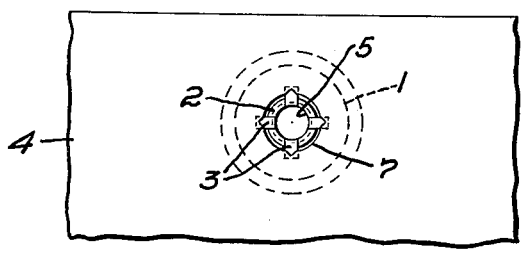
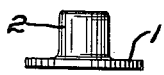
Inventor:
Vincent A. Creamer,
by Walter P. Jones
Att'y

United States Patent Office 3,091,842
Patented June 4, 1963

3,091,842
METHOD OF ASSEMBLING A THREADED NUT IN NON-ROTATABLE ENGAGEMENT WITH A SUPPORT
Vincent A. Creamer, Belmont, Mass., assignor to United-Carr Fastener Corporation, Cambridge, Mass., a corporation of Delaware
Filed June 12, 1959, Ser. No. 819,924
1 Claim. (Cl. 29—432)

My invention aims to provide improvements in nut assemblies and methods of assembling nut members to supporting members.

An object of my invention is to provide a threaded nut with a barrel portion, a nut barrel located in an aperture in a support, such as wood or other soft material, and the barrel having at least one attaching finger bent outwardly from the barrel into engagement with the support.

Another object of my invention is to form the attaching finger or fingers from the free end portion of the barrel of a nut and which is not threaded and have them extend into the support from a point intermediate the ends of the barrel.

A further object of the invention is to provide a method of attaching a nut to a support which comprises using a splitting tool to split fingers from the free end of the nut barrel and turn them outwardly into interlocking engagement with the support.

In the drawings which illustrate my invention:

FIG. 1 is a view, partly in section, showing a nut member and a support between upper and lower attaching tools prior to assembly;

FIG. 2 is a view of the parts shown in FIG. 1, the tools having been operated to complete the assembly operation;

FIG. 3 is a section taken on the line 3—3 of FIG. 2 to show the fingers formed from the nut and interlocked with the support;

FIG. 4 is a plan view of a nut prior to attachment to a support;

FIG. 5 is a side view of the nut shown in FIG. 4;

FIG. 6 is a sectional view of a modified form of my invention showing a nut barrel completely threaded throughout its length; and FIG. 7 is a plan view of the nut installation shown in FIG. 6.

Referring now to the specific nut installation I have selected, for illustration of my invention, a sheet metal nut having a flange 1, a threaded barrel 2 and attaching fingers 3 as clearly shown in FIGS. 2 and 3 and as it appears when attached to a support 4.

In the first five numbered figures of the drawing, I have shown a nut with a barrel 2 having its inner wall threaded for a portion of its length, beginning adjacent to the flange 1, by thread 5. A portion 6 of the barrel adjacent to the free end is unthreaded [FIG. 1] and it is from this unthreaded portion that the fingers 3 are formed.

Heretofore, sheet metal nuts have been attached to supporting members by various constructions and methods. One well known method is to pass the barrel of the nut through the support from one side so that a flange seats on that side and then the free end of the barrel is curled over by a riveting operation against the opposite side of the support.

My improved method is to use a nut having a barrel 2 of a given length and then pass the barrel into an aperture 7 in a support 4 [of wood or other suitable material] with the flange 1 engaging one face of the support 4, as best shown in FIG. 1. In this position the support 4 and nut are placed over a lower tool 8, supported in any suitable machine, and a suitable splitting tool 9 may then be moved, in any suitable manner, toward the work.

During the movement of one of the tools toward the other, the splitting tool 9 enters the aperture in the support 4. Since the splitting tool 9 has cutting ribs 10 [herein shown as 4 in number] that extend radially, they first engage material of the support 4 adjacent to the aperture 7. As the tool continues its movement the ribs cut grooves 11 [FIGS. 2 and 6] into the wood until the tool engages the free end of the barrel 2 of the nut. Then, as the movement continues, the ribs 10 of the tool 9 cut the fingers 3 from the barrel 2 of the nut and turn them outwardly into the support as shown in FIGS. 2 and 3. These fingers cooperate with the flange 1 to hold the nut in place and, since the fingers 3 are interlocked with the support 4, they prevent turning of the nut when a screw is threaded into engagement therewith.

It will be seen therefore that [in the nut shown in FIGS. 1, 2 and 3] the fingers 3 are formed from the unthreaded portion 6 of the barrel without in any way marring the thread 5 so that a screw may be entered into the barrel from either end. It is also important to note, that with applicant's installation and method, a given length of barrel may be used in various thicknesses of supports with the same attaching results whereas; older methods of riveting the end of the barrel against a support required nuts with various lengths of barrels to suit the various thicknesses of supports.

The same method of attaching a nut having a barrel threaded throughout its length with the resulting same application is shown in FIGS. 6 and 7. While the splitting tool may form slight burrs on the thread of the barrel, I have found that it is possible to thread a screw into this type of application from either end of the barrel and, as a matter of fact, the slight burrs may have a useful effect to provide a locking feature, although this is not one of the important features of applicant's invention.

While I have illustrated and described preferred embodiments of my invention, the scope of my invention is best defined by the following claim.

I claim:

The method of attaching a flanged nut having a threaded barrel in non-rotatable engagement with a support, said support having outer surfaces and said support being of greater thickness than the length of the nut barrel comprising the steps of inserting the nut barrel into a bore formed in the support, so that the nut flange engages one outer surface of the support and the end of the barrel terminates intermediate the outer surfaces of the support, holding the flange from movement relative to the bore and against said outer surface of the support, inserting a barrel cutting tool with a plurality of longitudinal cutting ribs thereon into the support bore from the opposite side from which the barrel is inserted by forcing said ribs on said cutting tool into the other outer surface of the support surrounding the support bore, to cut a plurality of longitudinal grooves in the bore wall, and to cut attaching fingers from said end of the nut barrel and progressively force said fingers outwardly into the grooves cut in said support, inwardly of the face of the support where the splitting tool is inserted, whereby said nut is attached to said support and prevented from rotation when a screw threaded member is threaded into said nut barrel.

References Cited in the file of this patent

UNITED STATES PATENTS

| | | |
|---|---|---|
| 550,314 | Adams | Nov. 26, 1895 |
| 1,487,731 | Enna et al. | Mar. 25, 1924 |
| 1,656,856 | Gagnon | Jan. 17, 1928 |
| 1,861,097 | Simons | May 31, 1932 |
| 1,954,761 | Wiggin | Apr. 10, 1934 |
| 2,055,443 | Jones | Sept. 22, 1936 |
| 2,433,607 | Hallock | Dec. 30, 1947 |
| 2,553,051 | Kingman | May 15, 1951 |
| 2,572,812 | Kral | Oct. 23, 1951 |
| 2,750,660 | Newcomb | June 19, 1956 |

FOREIGN PATENTS

| | | |
|---|---|---|
| 665,765 | Great Britain | Jan. 30, 1952 |